United States Patent
Jodra et al.

(10) Patent No.: US 7,453,597 B2
(45) Date of Patent: Nov. 18, 2008

(54) PROOF-DOCUMENT FORMATTING TO ENABLE FULL-CAPABILITY REMOTE PROOFING IN A COMPLETELY STANDARD PROOFING STATION

(75) Inventors: Rodolfo Jodra, Boise, ID (US); Ignacio Ruiz de Conejo, Barcelona (ES)

(73) Assignee: Hewlett-Packard Development Company, L.P., Houston, TX (US)

( * ) Notice: Subject to any disclaimer, the term of this patent is extended or adjusted under 35 U.S.C. 154(b) by 909 days.

(21) Appl. No.: 10/346,610

(22) Filed: Jan. 17, 2003

(65) Prior Publication Data
US 2004/0141192 A1 Jul. 22, 2004

(51) Int. Cl.
G06F 15/00 (2006.01)
(52) U.S. Cl. .................. 358/1.9; 358/504; 358/406; 358/518; 358/519; 347/19; 382/167; 382/112
(58) Field of Classification Search .................. 358/1.9, 358/504, 406, 518, 519; 347/19; 382/167, 382/112
See application file for complete search history.

(56) References Cited

U.S. PATENT DOCUMENTS

| | | | | |
|---|---|---|---|---|
| 5,510,910 A | * | 4/1996 | Bockman et al. ............ | 358/502 |
| 5,883,632 A | * | 3/1999 | Dillinger ..................... | 345/589 |
| 6,043,909 A | * | 3/2000 | Holub ........................ | 358/504 |
| 6,157,735 A | * | 12/2000 | Holub ........................ | 382/167 |
| 6,324,975 B1 | * | 12/2001 | Kondo ........................ | 101/171 |
| 6,611,349 B1 | * | 8/2003 | Vogt et al. .................. | 358/1.15 |
| 6,704,442 B2 | * | 3/2004 | Haikin et al. ............... | 382/162 |
| 6,943,917 B2 | * | 9/2005 | Tamagawa ................... | 358/1.9 |
| 6,954,286 B1 | * | 10/2005 | Muramoto .................. | 358/1.9 |
| 7,053,910 B2 | * | 5/2006 | Newman ..................... | 345/604 |
| 7,106,474 B1 | * | 9/2006 | Haikin et al. ................ | 358/1.9 |
| 7,227,666 B1 | * | 6/2007 | MacLeod .................... | 358/1.9 |
| 2002/0008880 A1 | * | 1/2002 | Dewitte et al. .............. | 358/1.9 |
| 2002/0149644 A1 | * | 10/2002 | Jodra et al. .................. | 347/43 |
| 2002/0154325 A1 | * | 10/2002 | Holub ........................ | 358/1.9 |
| 2002/0159083 A1 | * | 10/2002 | Arai et al. ................... | 358/1.9 |
| 2002/0181017 A1 | * | 12/2002 | Such et al. ................. | 358/1.15 |
| 2003/0179397 A1 | * | 9/2003 | Sugimoto ................... | 358/1.9 |

* cited by examiner

Primary Examiner—Twyler L Haskins
Assistant Examiner—Jacky X Zheng

(57) ABSTRACT

One single-stage proofer RIP replaces a conventional setup of two proofer RIP stages in series. Preliminary profile and data processing usually performed at the first of the conventional RIP stages, and source input terminal of the second, are instead performed in a preprocessor at the image-originating or production-hardcopy-printer station. The preprocessor combines production-printer forward and inverse profiles with a profile for the monitor, associated computer or graphics program—to form a single profile that converts monitor signals to perceptual data representing appearance of the predicted production copy. This three-way composite profile is applied to the source terminal of the single-stage proofer RIP.

10 Claims, 3 Drawing Sheets

PROOF-DOCUMENT FORMATTING TO ENABLE FULL-CAPABILITY REMOTE PROOFING IN A COMPLETELY STANDARD PROOFING STATION

RELATED PATENT DOCUMENTS

Closely related documents are other, coowned U.S. utility-patent documents—hereby wholly incorporated by reference into this document. One is in the names of Jodra et al., Ser. No. 09/832,638, later issued as U.S. Pat. No. 6,607,258, of interest for its general teachings of remote proofing refinement. Another such document is in the names of Such et al., Ser. No. 10/124,667 later issued as 7,327,481, related to business methods facilitating remote proofing. A third related document is in the names of Gonzalez et al., Ser. No. 10/176,563, later issued as U.S. 7,016,085—also related to remote proofing. Fourth through sixth are in the names of Dillinger et al., U.S. Pat. No. 5,883,632; and Bockman et al. U.S. Pat. Nos. 5,510,910 and 6,178,008—all touching on techniques for successive color-space conversions, some relating to lookup tables. A seventh such document is in the names of Vilanova et al., Ser. No. 09/945,492 and later issued as U.S. Pat. No. 7,134,737, relevant for its discussion of absolute colorimetric calibration in a color printer. Also potentially of interest and wholly incorporated by reference are U.S. Pat. Nos. 6,043,909 and 6,157,735 of Richard A. Holub.

FIELD OF THE INVENTION

This invention relates generally to proofing, in the printing industry; and more particularly to machines, procedures and document formats for making accurate remote proofs of color images to be later production-hardcopy printed. The invention enables making of such proofs when using a printer, preferably an incremental printer (or combination of a printer with a raster image processor, "RIP") that implements entirely standard color management.

BACKGROUND OF THE INVENTION (a) Brief overview—Color proofing is a process of prediction, namely predicting how color will appear 34 (simplified FIG. 1) when later printed on a production hardcopy printer 31. When performed in a conventional way, this prediction can be regarded as basically a two-step process:

- obtaining 42-47 data 48 that represent, in a device-independent way, how color will appear 34 in an output hardcopy 33; and then
- using some other device 55 (whether hardcopy or otherwise) that presents color visibly to actually display the substance of those data.

The "other device" is the proofing device or proofer 55, which can be a classical proof press or an incremental printer placing colorant 62 on a hardcopy medium 63, or a monitor 57 with dynamic image 58.

To accomplish this, the proofer 55 is called upon to take into account several different sets of information simultaneously:

- image data 21, most typically developed by an artist using a source computer 11 while viewing 16, 17 its computer monitor 14;
- a so-called "profile" 22 or tabulation of the color-representing properties of that monitor 14 (or of the computer 11, or of both);
- a second profile 47 of the color-representing properties of the proofer 55 itself; and
- yet a third profile (within 26) of the color-representing properties of the production printer 31.

All this is easily done, but the required equipment and programming conventionally must include semispecialized features to perform the manipulations.

Because most incremental printers—even including such printers with "RIP" devices—lack these semispecialized features, the proofing process heretofore has been limited to specially equipped proofing stations. This requirement for special stations is one of the major factors that have hindered widespread capability to perform remote proofing.

In other words, the need for special proofing functions is one significant obstacle to ready availability of remote proofing throughout the printing industry. This constraint arises not from any fundamental limitation of apparatus or programming, but strictly from unfortunate interactions between (1) the commercial conventions observed in manufacture of standard printers and standard "RIP" devices, and (2) industrial standards governing the conventional formatting of image data. Nevertheless, although artificial and nonfundamental, this barrier to performance of remote proofing by standard printer installations is very high.

This discussion does not relate to the requirements on a station for originating remote-proofing documents but rather only to the requirements on a remote station for receiving such documents and in response producing the hardcopy proof. It is generally accepted in the trade that a business entity which is to originate remote-proofing documents may have to invest in apparatus or software. In general this is not objectionable where the capability is central to the operations of that entity—as for instance with a graphic-design or graphic-artist firm.

The problem arises in finding the necessarily capable equipment at or near the facility of a client or customer, for viewing a received proofing document. In general most clients or customers do not want to make special investments, merely for the privilege of occasionally buying production printing services.

This entire situation will now be presented in greater detail. So that the exact character of the problem can be better appreciated, the presentation below will include further levels of information about the hardware constraints found in conventional systems and programming.

(b) Standard image data format—In conventional systems it is known to create a certain standard kind of file for use in transmitting color data to be hardcopy-printed or to be proofed. This industry-standardized file contains the image color data, accompanied by a transform or color-conversion matrix called a "profile".

The image color data can encompass multiple sets of image data, and corresponding multiple profiles. This is because multiple images can be in a single printjob and even on a single page—and in general the multiple images can be generated from different source devices, each having its respective profile.

The industry standard file is most often a specially formatted Adobe Portable Document File® (PDF). In a PDF document, each graphic object in a page has an associated color-space structure—the "profile"—which may be said to "describe" how the color looks.

(c) Color-space structures & device profiles—To put it more precisely, however, the structure is most commonly a transform (or transfer function) that can be used to convert the color data in preparation for printing or display on some specific image device, to obtain some specified or desired effect. Probably the most common such desired effect is to obtain on one particular image device the closest possible approximation to color as seen or measured on another particular image device. (In this document, "transfer function" is used in its broad sense of any relation between system outputs and inputs.)

The term "color space" is related to the concept of a color language—that is, a set of coordinates that can be used to describe a color. Some such spaces are simply machine language, i.e. the set of signals used to control a particular image device.

These can vary from—for example—red-green-blue ("RGB") for control of a typical additive-primary monitor, through black-cyan-magenta-yellow ("KCMY") for control of a typical subtractive-primary hardcopy printer. The latter may be a large printing press or a small desk-type incremental printer, and essentially anything in between. These machine languages or so-called "native" color spaces sometimes call for no color management at all; they are simply sent directly to the corresponding image device.

In addition to machine languages, a color space may be of the type sometimes called "perceptual"—but in the printing industry more commonly referred to as "colorimetric", since what is actually manipulated is almost always visible color as measured rather than as perceived. (For purposes of the present document, the terms "perceptual" and "colorimetric" will be used synonymously.) Some color spaces, such as the hue-plus-gray ("HPG") space introduced by Paul H. Dillinger of the Hewlett Packard Company, somewhat straddle the conceptual boundary between machine and perceptual space; such a space has particular utility in color control.

In the modern printing industry, conversions from one color space to another—particularly such conversions as are used to take account of the different color-displaying properties of different image devices—are performed by use of one of the various transforms discussed above.

The color-conversion information which the PDF document contains is usually in the form of an International Color Consortium® ("ICC") profile. From the website of the ICC:

"The International Color Consortium was established in 1993 by eight industry vendors for the purpose of creating, promoting and encouraging the standardization and evolution of an open, vendor-neutral, cross-platform color management system architecture and components. The outcome of this cooperation was the development of the ICC profile specification.

"The intent of the International Color Consortium profile format is to provide a cross-platform device profile format. Device profiles can be used to translate color data created on one device into another device's native color space. The acceptance of this format by operating system vendors allows end users to transparently move profiles and images with embedded profiles between different operating systems.

"This permits tremendous flexibility to both users and vendors. For example, it allows users to be sure that their image will retain its color fidelity when moved between systems and applications. Furthermore, it allows a printer manufacturer to create a single profile for multiple operating systems."

Thus in summary an ICC profile is a standard information format for use in specifying characteristics of image devices. The phrase "image device" is meant to encompass not only monitors and printers but also digital cameras and scanners.

Through use of the ICC's information format the color of an image can be kept relatively consistent in passage from a source device to a target or destination device.

An ICC profile can be embedded within the same data file, the standard PDF document, that carries all the image information. In fact it is conventional to insert certain ICC profiles directly into a PDF proofing file for transmission and handling as a unit with the image data.

Standard image devices are programmed to find their own respective profiles within that data file and extract them for use. Remote proofing adds the additional complexity that some profiles to be taken into account are not "their own"—i.e., a proofer must extract a profile for a production printer as well as for the proofer itself. Not all conversion matrices, moreover, are carried along in the PDF in this way.

Interestingly, the embedded ICC profile is not usually applied to the accompanying image data to produce a new, device-independent data set that resides within the PDF document. Rather, the profile simply accompanies the image data; as will be seen, this data-format convention in the printing and proofing industry is quite powerful but also a major contributor to the problems which the present invention addresses.

With this introduction in mind, a much more specific presentation of the conventional apparatus and methods will now follow. To facilitate understanding, this presentation begins with the underlying methodologies of the hardcopy printing itself.

(d) Hardcopy printing—Even before considering the subject of proofing, the value of color specification in a device-independent manner can be seen. In a graphic document, color can be specified without reference to any particular image device.

In practice, an image is typically created or refined by an artist-operator using a graphics program 12 (FIG. 1) in a computer 11, and looking 16, 17 at an on-screen 14 representation 15 of the image while adjusting computer controls, e.g. mouse and keyboard 18. The only clues to the desired final state of the image in the computer artist's mind are the signals 13 sent to the monitor, and the corresponding signals developed in the graphics program.

In this process the artist often relies very heavily (though without being aware of it) upon a data tabulation that describes or characterizes the color-presentation properties of the monitor 14. It is this data tabulation, the ICC profile 22 for that monitor, that enables other equipment to reconstruct—from the monitor control signals 13—what the artist sees.

Generally the necessary ICC profile 22 exists within the computer, and a copy of it may pass along a signal path 22a to the graphics program 12. The program can use such a copy in controlling the monitor signals 13—for example, in such a way as to produce an appearance 15 at the monitor which corresponds to absolute color indications within the graphics program.

Such absolute calibration of the graphics-program internal signals, however, is not necessary. What is necessary, rather, is that the ICC profile 22 express the true relationship between the on-screen appearance 15 at the monitor and the data signals 13.

This is so because a copy or version 21 of the monitor signals 13 is sent downstream, along the printing and proofing data pipeline, for use in driving the entire sequence of printing and proofing processes. The ICC profile 22 will be used to very specifically control the use, in those processes, of the monitor signal version 21.

The exact nature of the signal 21 can vary broadly. In some cases this information 21 is not a direct copy of the monitor signals 13, but may instead be a copy of the control signals within the graphics program—or may be derived in some relatively complex way from the monitor signals or graphics signals, or both.

It is even possible that the particular signals within the graphics program are actually CIElab or other perceptual/colorimetric color data. In such a case it is possible that the image data 21 transmitted downstream are likewise perceptual/colorimetric signals.

If so, then ideally the ICC profile is simply a unity matrix—or in other words, would not introduce any change at all to create a perceptual or calorimetric data set. For present purposes this special case will be considered quite unusual and in any event not a general case that can be assumed.

To avoid confusion from carrying along all these different possibilities, most of the discussion in this document will simply assume that these image data 21 transmitted downstream are machine-language signals, and probably monitor signals. Much of the discussion will refer to "source-device signals". The reader is asked to bear in mind that these various references to "monitor signals", "source-device signals" and the like are verbal shorthand for "monitor signals, or graphics program signals, or signals derived from them, which may even be perceptual data".

From the ICC profile 22 and the monitor signals 13, which usually are very strongly device-dependent (for instance RGB), a so-called "device-independent specification" or "colorimetric/perceptual specification" 24 can be generated. As suggested above, however, each of these phrases is somewhat a misnomer, because the PDF specification document 24 very commonly contains no image data that are in a device-independent form.

Thus for instance there are usually no "CIElab" data, or any other data that directly represent the color in the image as it appears or should appear 16 to the eye 17. Rather, the PDF specification document simply contains (1) the monitor-control signals 21 and (2) the ICC profile 22, both typically in the form of separate subfiles or databases held within the PDF document 24. From these could be prepared an image-data file in device-independent or perceptual form, but usually that is not actually done.

The two subfiles 21, 22 in the specification 24 are simply three-dimensional arrays of numbers. Just looking at the numbers conveys (for most people) no esthetic content. The intelligence is there, but the related image cannot be experienced by looking at the mere numerical array—only by looking at the screen 14, or directing the data array to some other image device for generation of a corresponding visible image.

One such device in fact is the intended production printer 31. Thus the PDF specification 24 is transmitted 25 for processing 26, most typically at the production-printer facility—as will be described shortly.

(To enable an overview of the printing and proofing process, FIG. 1 is greatly simplified—as for example at the block 26. Moreover, for tutorial purposes this drawing shows the succession of some processes in a conceptual way, when in actual practice arithmetic shortcuts are conventionally used that importantly change the sequence. These points in the drawing will be noted in the course of discussion.)

As will be seen, the ICC profile 22 of the monitor is the first of several ICC profiles that are involved in industrial color processing. Even at the printer facility, the source-device (monitor) profile 22 is not usually used to prepare a perceptual version of the image data 21.

Instead the source profile 22 is there passed into an arithmetic module 26 which combines that source profile 22 with a profile for the target printer 31. (Therefore the arithmetic module 26 here is shown accurately, though greatly simplified.)

More generally, the so-called calorimetric or device-independent specification 24 is usable in virtually any image device that is designed to print or display from such a color specification. By virtue of the industrial data-format conventions and commercial RIP standards, the phrase "virtually any image device" here means almost any commercially available image device. (What is printed or displayed, however, in general is not a proof—not an image made by one device to predict appearance of an image made by another.)

This specification 24 is usually an output from the computer 11, but may be prepared in an associated or separate computing environment—in principle even a raster-image processor associated with the production printer, or a custom processor that is internal to the printer. These latter possibilities, however, require special equipment and are relatively a typical.

Whether the device-independent specification 24 is an output 23 of the computer 11 or not, it is in general conceptual terms an input to the printer 31. In the printing industry the signals 21 in the graphics program 12 are customarily packaged in the previously mentioned PDF document together with the associated ICC profile 22, to enable any standard image device to produce a visible version of the image 15.

In any event, to this input 24—within the environment of the printer—are applied 25 certain preprocessing steps 26, discussed in detail in the next subsection (e) below. Preprocessing 26 yields a new machine-language version 27 of the original machine-language image signals 13, 21.

These resulting new machine signals 27 are applied 28 to the printer 31. In response the printer deposits corresponding physical colorant 32 onto a printing medium 33, and this medium thereby becomes the desired hardcopy—usually produced in very great quantity.

Light 34 reflected from any one such hardcopy 33 can be viewed by an observer 35, who thus sees an image that ideally is a close approximation to the image 15 originally seen 16, 17 on the computer monitor 14. Many or most people in industry, however, do not have the luxury of waiting to see how a print job will emerge from the production printer 31 before deciding whether they are happy with the colors as actualized by the totality of the printer processes 25-33.

Accordingly, and still before coming to the topic of proofing, certain methodologies move into play that can be helpful in maximizing the likelihood of satisfaction with the finished hardcopy appearance 34. A first of these methodologies is incorporated into necessary preparation 26 that is applied 25 to the perceptual image data 24.

(e) Hardcopy refinements: preliminary work—The basic functions of that preparatory processing 26 are indispensable, for at least three reasons. First, a printer 31 requires input machine-language signals 27 appropriate to the four or more subtractive primary colorants used in printers, and these are very different from the three data channels 13 embedded 21 in typical perceptual color specifications.

The preparation arithmetic 26 accordingly converts the 3-D monitor-language data 21 into 3-D production-printer language. For an offset printing press this typically means making color separations and printing plates, whereas in incremental printing the conversion is actually done by a numerical processor.

These steps are encompassed by the preparation arithmetic 26. They allow a printer to make something at least resembling, in a very general way, the desired image 15.

Second, different kinds of images—as printed on different kinds of printers—require various different mechanical ways of enabling image details to be manifested on a printing medium. Continuous-tone images such as photographs or paintings, for example, ordinarily cannot be reproduced in all their native smooth color gradations (even if the image is all grays, or otherwise monochromatic) without some intermediate means for expressing all the millions of possible colors and gradations with just e.g. four colorants (or a single colorant).

For a printing press, technicians deal with this problem by the well-known techniques of halftoning. In an incremental printer the corresponding accommodation is performed automatically by program techniques including dithering or error diffusion—sometimes collectively called "rendition".

Third, operating any kind of printing device involves some sort of sensitive balance between, on one hand, achieving desired color effects and, on the other hand, managing the physical processes of colorant application, colorant fixing, and print-medium transport. Operation of a press sometimes calls for constant attention to inking, water flow, and other variables; while for incremental printing many difficult analogous problems are managed by automatic processes—within the preprocessing 26—such as printmasking, depletion, propletion and the like.

Now in addition to those three basic functions of preprocessing 26, as noted above a fourth function can be incorporated that promotes optimum results. It is known for every printer that simply converting a perceptual color specification into corresponding machine-language data does not produce colors very closely related to those seen on the screen 14.

The printer 31 itself—together with all of its associated processes 26, 27, 28, 32, 33—in effect executes a color-distorting transfer function, which is the resultant of the myriad color-influencing variables of operating a complicated mechanism to deposit particular kinds of ink onto a particular kind of paper or other printing medium.

Therefore the preprocessing 26 also introduces a carefully refined three-dimensional color correction. This correction is hoped to be the inverse of the distorting transfer function generated by all the other printer phenomena, including distortions arising in other portions of the preprocessing itself.

(f) Hardcopy refinements: self calibration—An even more sophisticated way of optimizing the approximation of a desired image 16 by the hardcopy appearance 34 is closed-loop color calibration or correction, or both. Such feedback techniques can take any of at least three different forms—depending mainly on the sort of image that is involved to develop the feedback signals.

At first, rather than use a hardcopy 33 printed by the production printer 31 itself, a factory calibration pattern can be physically substituted in the position of the printer's own hardcopy 33. This calibration chart is then read by a sensor and analytical circuitry—respectively symbolized very loosely and conceptually in the accompanying drawings by a hand magnifier 36 and "analysis arithmetic" block 37.

Since the pattern being read is basically unrelated to the hardcopy generation process, in this first stage, the purpose of this procedure can only be calibration of the "sensor" 36 and analytical block 37 themselves. Suitable changes internal to those two devices are then made to maximize the likelihood of faithful information collection by those devices later. Absolute reference level, in particular, can be made much more accurate in this way.

Second, the printer 26-28, 31 can be commanded to generate signals 27 representing a fixed test pattern, and then to proceed with printing 32 a hardcopy form of that pattern. Reading 36 and analyzing 37 this type of pattern can be used to derive feedback data 38 for use in modifying any parts of the preprocessing 26, printer operation 31 and inking 32 that the readings reveal to be in error.

In particular, colorimetric linearity and neutrality of nominally neutral colors—as well as absolute maximum-saturation values—can all be much improved by this approach, through feeding back adjustments to the preprocessing block 26 that introduce a compensating opposite nonlinearity or absolute reference, or both.

Third, a particular image (either calibration pattern or actually desired image) can be fed into the printing system from a suitable image-creation or -refinement source 11-18, 21-25. This type of adjustment may be general, like the response to reading of the test pattern, or may be specific to the particular image used.

In the latter case, very fine adjustments of particular subtle or otherwise difficult colors can be very sensitively adjusted to agree with the artist's desires or with objective information obtained from the input system 11-18, 21-25. As suggested above, however, this type of fine tuning of a production printer is quite unusual and somewhat undesirable.

Printshops typically earn a living for their operators by operating presses and other kinds of printers at high speed and for as many hours of the work week as possible—and the press typically has a paid operator whose idle time is of great concern to management. Accordingly only a rare printjob has high enough value and priority to make such real-time adjustments economic.

(g) Proofing—Yet, when the image is actualized as a hardcopy, in general it will not appear either exactly as on-screen or even as specified by the data array 24. Thereby hangs the entire field of "proofing" (both remote and local).

People want to know, before running a job on an expensive production printer and with thousands of dollars of expensive stock, ink and time, how it will look. At least some of those people are commonly remote from the production machine.

Hence the main justifications for separate equipment, procedures and staff for preproduction proofing. With these justifications, however, comes also a caveat: in order to be useful, proofing must predict final production color accurately, quickly and economically.

In order to produce an accurate prediction (using a proofing device) of how such color will come out from a production printer, it is necessary to take into account the characteristics of that production printer. (As this printer is not capable of producing all colors accurately, some of the colors defined in the document will be replaced by others that the production printer can produce.)

To take into account that printer's characteristics, usually a working copy 24' of the original PDF specification document 24 is made 41—for passage to the location of the proofer 55. The color information 21 in the PDF copy 24' is then converted 42, 44 to device-dependent hardcopy output colorants 45 of the production printer 31. (Here this presentation follows a conceptual, tutorial sequence rather than the actual practical one.)

To accomplish this, first a new transfer function 44 is developed from the source-device profile 22—and from imported 43 characteristics of the production-printer pipeline 25-28, 32-38. (These characteristics are commonly in the form of yet another profile.) The new transfer function 44 can be applied 42 to the original monitor data 21 in the specification copy 24'.

This transfer function 44 simulates, as accurately as feasible, all the color influences 43 of the printer 31 and its associated processes 24-28, 32, 33, as well as the color influences of the monitor profile 22 that is also in the specification copy 24'. (If desired the transfer function 44 can be assembled in the form of an ICC profile.) Conceptually or tutorially speaking, the colorimetric data 21 from the specification copy 24', and the transfer function 44, may be regarded as packaged together in a new PDF document 92.

In principle such a document as a unit can then be provided (e.g. transmitted) to the proofer 55. Based on the contents of that PDF document 92, the system develops a full simulation 45 of the colorant 32 on the printing medium 33, as produced by the production printer 31.

To this colorant model 45 is next applied 46—in principle—still another ICC profile 47, to obtain a new color specification 48. This latter data set 48 represents the appearance 34, as an observer perceives it, of the colorant 32 deposited by the production printer 31 on the medium 33.

To this color specification 48 is applied 51, again in principle, a set of computations 52 associated with the proofing device, which yet again convert the data in the model for input to the proofer 55. (An ICC profile 22 described the first transformation of original color signals to device-independent ones; here another ICC profile 47 models the simulated device-dependent production-printer color. The ICC standard is flexible enough to support both types of applications of ICC profiles.)

Although, as stated above, "in principle" another ICC profile 47 is applied 46 to the simulated-production-image data 45, in actual practice that production-printer ICC profile 47 is instead first combined with yet another such profile for the proofer 55. It is a combination of these two profiles that is actually applied to the simulated-production-image data 45, as will be detailed in the following subsection (h).

Upon receiving and using the final color data set 48, the proofer 55 creates a perceptible image per se, for viewing (as distinguished from merely a perceptible array of numbers). These computations 52 are strongly analogous to the preparation arithmetic 26 in the production-printer process train discussed above.

In fact, from this point to the end of the proofer processing branch 41-48, 51-59, 61-68, all of the hardware and method steps are very closely analogous to those already discussed above in the production-printer processing branch 26-28, 31-38. While analogous, however, they are not the same.

The proofer 55 requires machine-language signals peculiar to itself, and distinctly different in both kind and form from those of the production machine 31. The proofer also introduces its own specific complex of divergences from an accurate and linear representation of what is in the perceptual specification 48.

(h) Processing details—The above subsections (a) through (g) offer a broad overview and general understanding of the hardware and procedures conventionally used in remote proofing, but do not come to the "commercial conventions" and "industrial standards" that create the obstacle discussed in section (a). Those conventions and standards are explained next.

For the most part those features can be localized in the "arithmetic" modules 26, 52 discussed above, and particularly in the transfer function 44—part of the proofer pipeline—that simulates the arithmetic module 26 and associated processing of the production-printer pipeline. The functions of those modules are generally distributed among three or more different facilities—e.g. typically the document originator's shop, the printshop, the customer's premises, and often facilities of application service providers ("ASPs") as described in certain of the above-mentioned, incorporated patent documents.

Conventionally, the way in which the image data and three profiles are all taken into account calls for use of two separate transformation stages 111, 131 (FIG. 2), functionally in series—usually within a single RIP or "raster-image-processor" 44. Internally these two stages are almost identical, but the ways in which they are connected to signal paths and to each other differ.

Each RIP stage 111, 131 has a respective "transform combination process" module 112, 132 that receives a respective pair of inputs, namely:

for the first unit of the pair, the source-device profile 22 and the press profile 122; and for the second unit of the pair, an approximate inverse 123 of the press profile; and the proofer profile 126.

(The specific characters of these four inputs will be taken up momentarily.) The two transform-combination modules 112, 132 process their respective profile pairs identically, producing respective composite profiles 113, 133.

Within the RIP 44, each stage 111, 131 also has a respective module 114, 134 that applies the newly formed composite profile 113, 133 to a respective image-data input 21, 27. For the first RIP stage 111, the input is the image data 21 directly from the source device 14, 11; while for the second stage 131 the input 27 is the output of the first stage.

Typically the first RIP stage receives its input image data 21 and the source profile 22 directly, as a pass-through (FIG. 2) without modification, by way of the document file 24—which is transmitted from the source device 14, 11. Most commonly the file 24 is transmitted through some wide-area network such as the Internet, but alternatively it can be transmitted through a LAN, or by postal-mailing or hand-carrying a CD-ROM or even a floppy disc.

The source-device profile 22 entering the first RIP stage 111 is a transform for conversion of source-device machine-language signals 21 into device-independent signals. The press profile 122 also entering the first RIP stage 111 is a transform for conversion of device-independent signals into the production-printer machine-language signals 27. Thus in terms of dimensional analysis the two transforms entering the first RIP stage are opposites: machine-to-perceptual, and perceptual-to-machine, respectively.

Inside the first RIP stage, accordingly, the transform-combination module 112 is able to formulate a composite transform 113 for conversion 114 of source-device machine language 21 directly into the production printer language 27—bypassing device-independent language. Hence it is not necessary to first convert monitor signals to perceptual ones and then those perceptual ones to production-printer signals; just one data conversion takes care of both steps. (It may now be possible to see how some of the conceptual sequence 41-48, 51, 52 in FIG. 1 is not only simplified but also inaccurate.)

The output 27 of the first RIP stage 111 should be identical to the machine-language input of a production printer 31 (FIG. 1), or in other words to the output 27, 28 of a RIP stage that is implicitly included in the "production-printer arithmetic" block 26. This is true because all three signals 21, 22, 122 into the first RIP stage 111—and its internal operations 112-114 too—are substantially identical to the corresponding signals and components in the production-printer data pipeline.

Thus, of the two RIP stages 111, 131, the first one 111 is the more standard, particularly in that it is set up exactly as a RIP for the final production printer is set up—with just one exception: the output does not pass directly to any printer, but rather passes to the other RIP stage 112. Indeed the entire purpose of the first stage 111 is to form signals 27 that are exactly the same as will flow to the production printer.

Processing in the second RIP stage 131 is more interesting and more sophisticated. The approximate inverse profile 123 (entering the source input terminal of the RIP stage 131) is a transform for conversion of production-printer machine-language signals 27 into, once again, device-independent signals. This function is precisely analogous to that of the source-device transform 22 (entering the source-device input terminal of the RIP stage 111)—except that here the assumed source device is different, namely the production printer 31 rather than the monitor or computer 14, 11.

This new source transform 123 is here called an "approximate" inverse because its conversion of (1) production-printer machine language into colorimetric language is not exactly the inverse of converting (2) colorimetric language to production-printer machine language. Part of this latter conversion (2), as will be recalled from subsection (e) above, is essentially a matter of artifacts. That is to say, the production-printing modules 26-33 themselves execute a color-distorting transfer function relating to ink/media effects and mechanism irregularities.

Some of these may introduce, e. Q., higher-order relations, rather than simple multiplicative factors; and correctly unraveling these nonlinear effects makes the inverse only approximate. This divergence from the exact inverse accordingly makes the overall proofing function crucially important and valuable. Without this important feature, the proof could merely show how the production hardcopy is supposed to look, rather than how it will.

The proofer profile 127 (entering the target input terminal of the RIP stage 131) is a transform for conversion of device-independent signals into the proofer machine-language signals 27. This function is precisely analogous to that of the target-device transform 122 (also entering the first RIP stage 111)—except that the target device is different, namely the proofer 55 rather than the production printer 31.

Hence as previously indicated, the second RIP stage 131 works almost identically to the first RIP stage 111, formulating a composite transform 133 that directly converts production-printer machine language into proofer machine language—bypassing device-independent signals. Here again in the second RIP stage 131, in terms of dimensional analysis the two transform inputs 125, 127 are opposites, and flow in the same directions as in the first RIP stage 111: machine-to-perceptual and perceptual-to-machine respectively.

The overall effect of the two stages in series, therefore, is to convert original source-device 14, 11 signals 21 into proofer signals 53 that will cause the proofer to generate an image that simulates appearance on the production printer 31, not on the original source device 14, 11. This result is exactly what is desired.

An operator at the proofer station can connect the input signals 21 to a standard monitor 14' (FIG. 2). This connection allows the operator to at least simply look at the image and see what sort of scene is portrayed.

Hence the conventional proofing installation (FIG. 2) offers several very useful and important advantages. Unfortunately, however, it also suffers from at least one major drawback:

All these favorable results require two RIP stages 111, 131 operated in series—not a conventional or standard portion of an ordinary incremental-printer installation, or indeed any other image-device installation except in proofing. Thus at minimum it demands acquisition of an extra piece of software, moderately expensive and not generally found in any office-supply store or even in just any computer-printer store.

Furthermore, candidate designs for rearrangement of signals or equipment to circumvent these requirements must confront restrictions typically found in conventional RIPs and in conventional printer installations. For example, a standard RIP requires that the profile entering the source-profile input terminal 22', 125 be a transform for converting machine-language signals into device-independent signals.

As another example, in some standard proofing RIPs the proofer profile 126 is not fed into the RIP at an input terminal 127 but rather is embedded within the RIP. This means that the proofer transform must stay the same.

Various creative software or data-processing solutions might be envisioned for overcoming the hardware limitations discussed above. The constraints just mentioned, however, may obstruct such solutions.

This conventional arrangement does have another drawback, though a somewhat academic one: it requires an inelegant technique. The entire image data set must actually pass through two full conversions, rather than only one as in the production-printer data pipeline. This means twice the processing time at the proofing facility.

It was earlier noted that the various pieces of hardware may be distributed among different facilities or installations. For the above-discussed standardization problem, therefore, a candidate solution that may suggest itself is to site the first RIP stage 111 at the document originator's location, perhaps associated with the originating computer 14—or alternatively at the production printshop.

This solution would enable the second RIP stage 131 to be wholly conventional, but would require transmitting:

the press-color signals 27 (rather than the original source-device signals 21), together with the previously discussed approximate-inverse profile 123.

In purest principle this arrangement is useful, but in actuality it is impractical. Among other reasons, the press color data 27 represent assembled full pages, and are at full resolution of the production press—and therefore may be for example some two orders of magnitude more data to transmit than the unassembled image data.

(i) Transform-combination procedure—It remains to mention how the transform combination processes 112, 132 operate. The most-practical procedure involves sampling of the color space used by the source device in each RIP stage—i.e., the gamuts of the monitor etc. 14 for the first RIP stage 111 and of the press 31 for the second RIP stage 131, respectively. These color samples, together with the target-device profiles 122, 126 respectively, are then used to merge the source-device profiles 22, 123—or, in other words, the color samples are used to combine the source and target profiles for each RIP stage.

The second of these steps, the merging or combination, is the computational heart of the overall transformation in each case; it in turn preferably includes these substeps:

transforming these sample colors by applying the source profile, to obtain a corresponding sample in a device-independent color space, i.e. as perceptual/colorimetric data (in ICC parlance often called a "connection space);

then retransforming the new, perceptual-space sample colors by applying the target profile, to obtain a new version of the same sample colors, but now expressed in the machine language of the target device—i.e. representing those colors as signals for driving the target device;

next, from the results of these conversions, building an interpolation table—which is to say, a lookup table in which actual image input colors spaced between the original sample colors can be located so as to look up, either directly or by interpolation, the values of corresponding target-device signals; and including the interpolation table in another ICC profile, which is the modified ICC profile.

(A very loosely analogous process is described in the earlier-mentioned document of Bockman and Li, as to tracing selected input colors through one or more transforms to develop a lookup table. The purpose in that document, however, is quite different.)

The interpolation table thus becomes the composite color transform 113, 133. Thereafter by looking up actual image input signals 21 (or predicted production-printer colors 27) in the interpolation table or "composite transform", extracted from the modified ICC profile, target-device signals are obtained for driving the next stage.

In the first RIP stage 111, those output target-device signals drive the second RIP stage 131; and in the second RIP stage 131 those target-device signals drive the proofer 55. In both cases, the target-device signals provide a close approximation to what would be obtained by processing those same input colors through the original profile pairs 22/122, 123/126 sequentially.

In each of the transform-combination modules 112, 132 the composite transform or profile 113, 133 that emerges is dimensionally unlike both of its parent profiles 22/122 and 123/127. That is, the composite profile converts machine language to machine language—whereas as noted earlier the parent transforms are machine-to-perceptual and perceptual-to-machine respectively; and RIPs are conventionally programmed or even hardwired in full expectation of such transforms.

Any imperfection in the sequential mapping—as for example picking inadequately fine sampling intervals in gamut regions where color response varies rapidly—leads to imperfections in one or usually both composite transforms 113, 133, and resulting imperfections in accuracy of the proof. For this reason it might be supposed that the press-color signals 27 flowing between the two RIP stages 111, 131 might be called "nearly identical" rather than "identical" to the actual press-color signals 27, 28 at the production printshop.

Substantially the same information, however, is used to construct a composite transform within the preparation arithmetic 26 in the printshop data pipeline. Hence the proof should be substantially identical to the press hardcopy, within the ability of the proofer to emulate the press gamut.

(j) Holub—Remote proofing is the topic of U.S. Pat. Nos. 6,043,909 and 6,157,735 of Richard A. Holub—though it seems with primary emphasis upon soft (or "virtual") proofing. His patents focus on the mathematics of color science.

Holub recounts the known facts that it is possible to characterize the color-rendering details of proofing devices (and production printers as well) in a way that is perceptually based and mathematically general. He also reminds his readers that it is possible to invert such characterizations so that a proofing device can generate perceptually standardized, or nearly standardized, color appearances.

By simply aggregating such known methods Holub outlines how to operate production and proofing systems over a broad network so that color variations between proofs and production runs are minimized, and production of the same job at widely separated plants produces near-identical output. By virtue of this essentially conventional scheme, multiple production facilities can run duplicate portions of a very large, geographically disparate pressrun to minimize shipping distances, delays and costs.

The Holub patents do elaborate at a high level the concept of a "virtual proof", and summarize—

"The VP enables revision of color aspects of page/image data up to and even during rendering. An important aspect of revisability is the customization of data for rendering on particular devices. An equally important property of revisability is that page/image data need not be altered directly; rather they are 'interpreted' in various ways through the medium of the VP. This eliminates the need to maintain multiple, large versions of page/image data at a particular node or to move one or more versions around the network repeatedly as a result of re-interpretation."

These are fine goals. Holub, however, says little about practical, workerlike steps for doing (or avoiding) such interpretation or reinterpretation—or otherwise for accomplishing the laudable objectives he defines.

(k) Conclusion—Compatibility problems between industrial data-format standards and commercial printer/RIP conventions have continued to impede achievement of proofing that is not only very accurate but also practical to use with completely standard equipment at a proofer station. Thus important aspects of the technology used in the field of the invention remain amenable to useful refinement.

SUMMARY OF THE DISCLOSURE

The present invention introduces such refinement. In its preferred embodiments, the present invention has several aspects or facets that can be used independently, although they are preferably employed together to optimize their benefits.

In preferred embodiments of a first of its facets or aspects, the invention is a method of preparing a final-output-color prediction file for use in remote proofing. The method includes the step of extracting from a proofing file a color profile associated with an image source device used in creating the proofing file.

It also includes the step of adapting the extracted color profile to incorporate color effects of a target output device on which it is intended to produce a hardcopy output, to obtain a numerical tabulation that predicts appearance of that hardcopy output. To be more specific, this tabulation predicts the hardcopy appearance from image-source-device signals. In other words, we suppose that:

(a) a given set of image-source-device signals will be used to drive the target device, to print a hardcopy; and (b) the new numerical tabulation is applied, as a transform, to that same set of image-source-device signals.

Now, the result of the transformation in (b) is a prediction of the perceptual appearance of the hardcopy in (a). The method also includes the step of inserting the adapted profile into the proofing file.

The foregoing may constitute a description or definition of the first facet of the invention in its broadest or most general form. Even in this general form, however, it can be seen that this aspect of the invention significantly mitigates the difficulties left unresolved in the art.

In particular, this facet of the invention creates a proofing file that can be used directly in virtually any standard proofing system, as in particular a standard printer with an associated standard RIP. No series-dual-RIP-stage setup or other specialized setup is required at the proofing station.

Furthermore the proofing file can include the source-device control signals (e.g. monitor signals), rather than press-language signals. Therefore it is able to straightforwardly generate a visible monitor display just as the conventional dual-RIP-stage system does.

Although this aspect of the invention in its broad form thus represents a significant advance in the art, it is preferably practiced in conjunction with certain other features or characteristics that further enhance enjoyment of overall benefits. For example, one basic preference is that the extracting and adapting steps exclude reading all image-color data from the file.

Another, alternative basic preference is that the extracting and adapting steps include reading and processing a representative sample of a small fraction of image-color data from the file to obtain a corresponding sample of estimated output colors from the target device. As to the term "small", it will be understood that substantial improvement in adapting throughput may be gained even if the small fraction is simply less than half of all image-color data in the file.

This degree of advancement is very easily achieved, since selection of image data satisfying this criterion are not at all sensitive or "touchy". Using essentially, for example, every other point—or every third point sacrifices no accuracy whatever.

More preferably, however, the fraction is less than a tenth of all image-color data in the file. This kind of selectivity requires somewhat greater care on the part of system designers, to avoid portions of the gamut of the production printer (or any other anticipated image device) in which characteristics change particularly quickly with small changes in input color.

Still more preferable for great improvements in operating efficiency is use of a fraction less than a hundredth of all image-color data in the file. Such a choice represents a processing-time, transmission-time and storage-space improvement by two orders of magnitude in forming the composite profile.

Here, however, as people of ordinary skill in this field will appreciate, some degree of sophistication and patience should be brought to the task of selecting representative data points. For instance it is best to use a selection principle which takes small steps, between color points to be traced, where the overall output-color response is changing most rapidly—and conversely, large steps where the response is changing most slowly.

To say the same thing in other words, the selection principle ideally makes the density of color points to be traced, throughout the gamut, related in some proportional sense to the sensitivities (e.g. gradients) of overall output-color response. Care devoted to the sculpting of selection criteria at this point will bear fruit in accuracy of proofing, even while enjoying the very large factor in processing reductions.

Not even a small fraction of the image input is required, as a uniform sample of all color space can be used to generate the composite profile. If this approach is employed, however, for some images colorimetric accuracy in the finished proof may be degraded significantly.

If the above-mentioned "small fraction" preference is observed, then a subpreference is that the processing include the step of applying the extracted color profile to the small fraction of image-color data, to develop a corresponding intermediate sample of estimated perceptual appearance of the image from the image source device. In this case the processing also includes applying, to the intermediate sample, forward and inverse color profiles for the target device to find a resultant representation of estimated output appearance at the target output device.

If the system complies with the processing subpreferences just described, then a still further preference in turn is that the processing also include the step of using the estimated output colors to develop the adapted profile. If this is done, then it is yet further preferred that this using step include interpolation to obtain further estimated output colors intermediate among those in the corresponding sample.

In preferred embodiments of a second of its aspects, the invention is a method of making a preproduction proof of an image. The method includes the step of obtaining transforms associated with:

an imaging device used as an image monitor,
a production hardcopy printer, and
a proof generating device.

The method also includes the step of combining the monitor and printer transforms to form a composite transform that represents a conversion from monitor-control signals to perceived appearance of hardcopy color. Another step in the method is using the composite transform and the proof-device transform to control the proof-generating device.

The foregoing may constitute a description or definition of the second facet of the invention in its broadest or most general form. Even in this general form, however, it can be seen that this aspect of the invention too significantly mitigates the difficulties left unresolved in the art.

In particular, this facet of the invention carries forward, into the actual proofing process, the benefits stated above for the novel proofing file of the first aspect of the invention. The invention enables proofing at the highest level of fidelity with no more than a standard printer setup—e.g. standard printer with standard RIP. Yet derivation of the composite transform itself takes negligible time and resources. In fact as will be seen the composite transform saves one full image-data-conversion pass, of the two such passes used conventionally.

Although this second aspect of the invention in its broad form thus represents a significant advance in the art, it is preferably practiced in conjunction with certain other features or characteristics that further enhance enjoyment of overall benefits.

For example, one basic preference is that the using step include inserting data of the composite transform into a standard document, and then providing the document to the proof generating device. Whether or not this basic standard-document technique is used, it is also preferable that the obtaining step include, singly or in combination:

obtaining a transform representing a calorimetric profile of color seen on an image monitor as a function of device-language signals driving the monitor;

obtaining a transform representing color signals to be directed into the proof device, as a function of a perceptual representation of visible color to be displayed by the proof device; and obtaining one transform representing color signals to be directed into the production hardcopy printer, as a function of a perceptual representation of visible color to be displayed in the hardcopy; and also preferably obtaining another transform representing a calorimetric profile of visible color produced by the production hardcopy printer—as a function of color signals directed to the production hardcopy printer.

In preferred embodiments of a third of its basic aspects or facets, the invention is apparatus for remote preevaluation of a printing job to be run. The apparatus includes some means for extracting from a proofing file a color profile associated with a particular computer, or associated monitor, or graphics program running in the computer. For purposes of breadth and generality in discussing the invention, these means will be called simply the "extracting means".

The apparatus also includes some means for manipulating the extracted color profile to derive a hybrid profile. This hybrid or composite profile represents perceived appearance of colors printed with a particular production hardcopy printer, as a function of image data prepared using the corresponding printer, monitor or graphics program. Again for breadth and generality these means will be called the "manipulating means".

The apparatus further includes some means for inserting the derived profile into the proofing file—once again, the "inserting means". Also included are some means for applying the hybrid profile to a source input terminal of a substantially standard proofing device or substantially standard associated RIP—the "applying means".

The foregoing may represent a description or definition of the third aspect or facet of the invention in its broadest or most general form. Even as couched in these broad terms, however, it can be seen that this facet of the invention importantly advances the art.

In particular, this third aspect of the invention provides an entire proofing system that has the benefits previously described for the file-preparation method and the proofing method of the first and second facets of the invention.

Although the third major aspect of the invention thus significantly advances the art, nevertheless to optimize enjoyment of its benefits preferably the invention is practiced in conjunction with certain additional features or characteristics. In particular, preferably the extracting means are at an image-generating location or production-printer location, the manipulating means are at an image-generating location or production-printer location, and the applying means are at a proofing-device location.

Further preferably the apparatus includes, at a proofing location, a standard monitor—and some means for directly connecting data signals from the proofing file to drive that monitor. The monitor is thereby caused to display an image represented in the data signals.

Another basic preference is that the extracting means include first circuitry operating a program to extract the color profile from the proofing file. In this event the manipulating means include second circuitry operating a program to manipulate the extracted color profile; and the inserting means include third circuitry operating a program to insert the derived profile into the proofing file.

If this circuitry-based preference is observed, then it is further preferable that the second circuitry manipulate a small fraction of image-color data in the proofing file. If this "small fraction" preference too is met then it is still further preferable that the small fraction be one-twentieth, or less.

All the foregoing operational principles and advantages of the invention will be more fully appreciated upon consideration of the following detailed description, with reference to the appended drawings, of which:

DETAILED DESCRIPTION OF THE PREFERRED EMBODIMENTS

Preferred embodiments of the invention enable a completely standard incremental-printer installation to serve as a proofing station, and also to do so with only a single pass of the image data through a conversion step.

Figure 2:
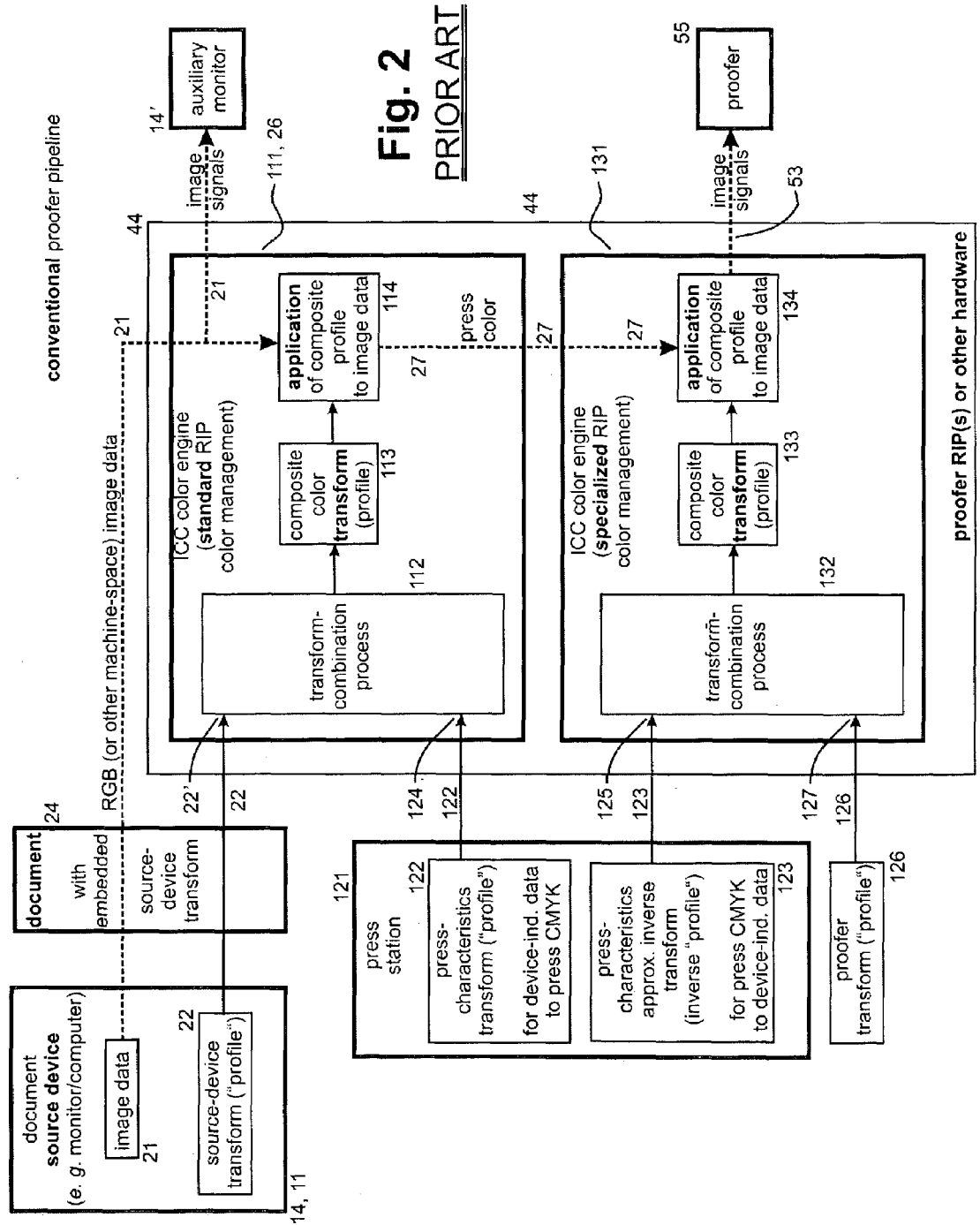
FIG. 2 is a like view but at a lower level, demonstrating data-processing details of the FIG. 1 system and method that clarify the problem solved by the invention.
Figure 3:
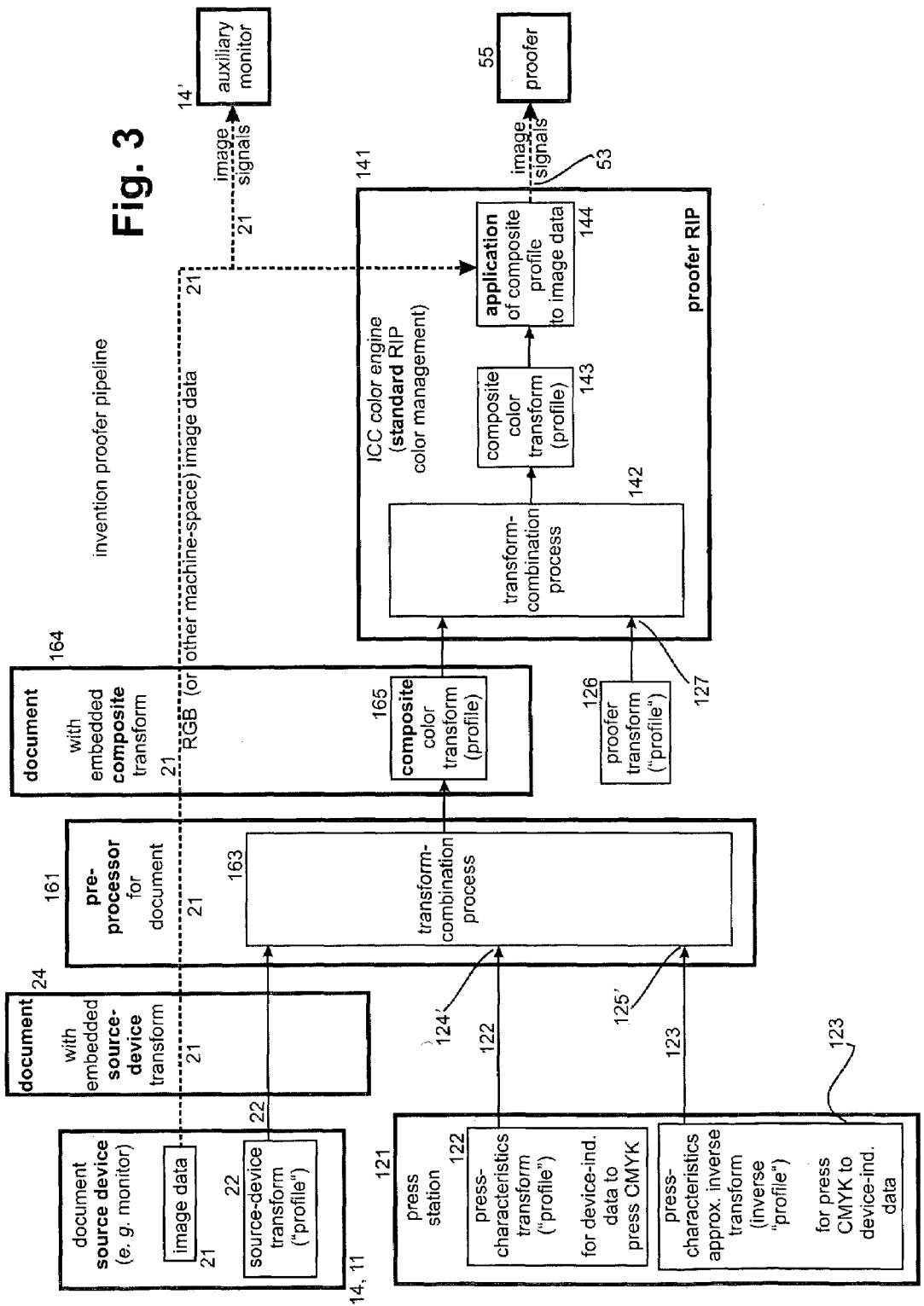
FIG. 3 is a like view representing corresponding data-processing details in preferred embodiments of the invention.

From an overall system point of view, the five input elements 21, 22, 122, 123, 126 are identical to those of the conventional system. One of the conventional-proofer-station RIP stages 111, 131 (FIG. 2), however, is eliminated. The original monitor data 21 pass directly to a single-stage proofer-station RIP 141 (FIG. 3).

That single-stage RIP 141 at the proofer station is identical to each of the two RIP stages 111, 131 in the conventional system. The single-stage proofer RIP receives monitor data, rather than printer data, also facilitating direct monitor display of the image data at the proofer—without resorting to e.g. Acrobat's CMYK display function, as would be needed for display of printer machine-language signals.

1. Novel Preprocessor, and Three-Way Composite Profile

These improvements are made possible by a preprocessing module 161. It can be located at the document originator's station or at the production printing shop—or any other facility with access to the source image 21 and profile 22, and the production-printer profiles 122, 123.

The preprocessor 161 simply combines 163 the conversions for the three profiles 22, 122, 123 into a single, new type of transform 165. It stores that new transform 163 in a new version 164 of the PDF image-proofing document, for transmission to the proofing station.

Purely in dimensional-analysis terms, the novel transform can perform a conversion from monitor signals 13, 21 to perceptual data—and thus is acceptable at the source-profile input terminal of the single-stage proofer RIP 141 as a machine-to-perceptual transform.

Figure 1:
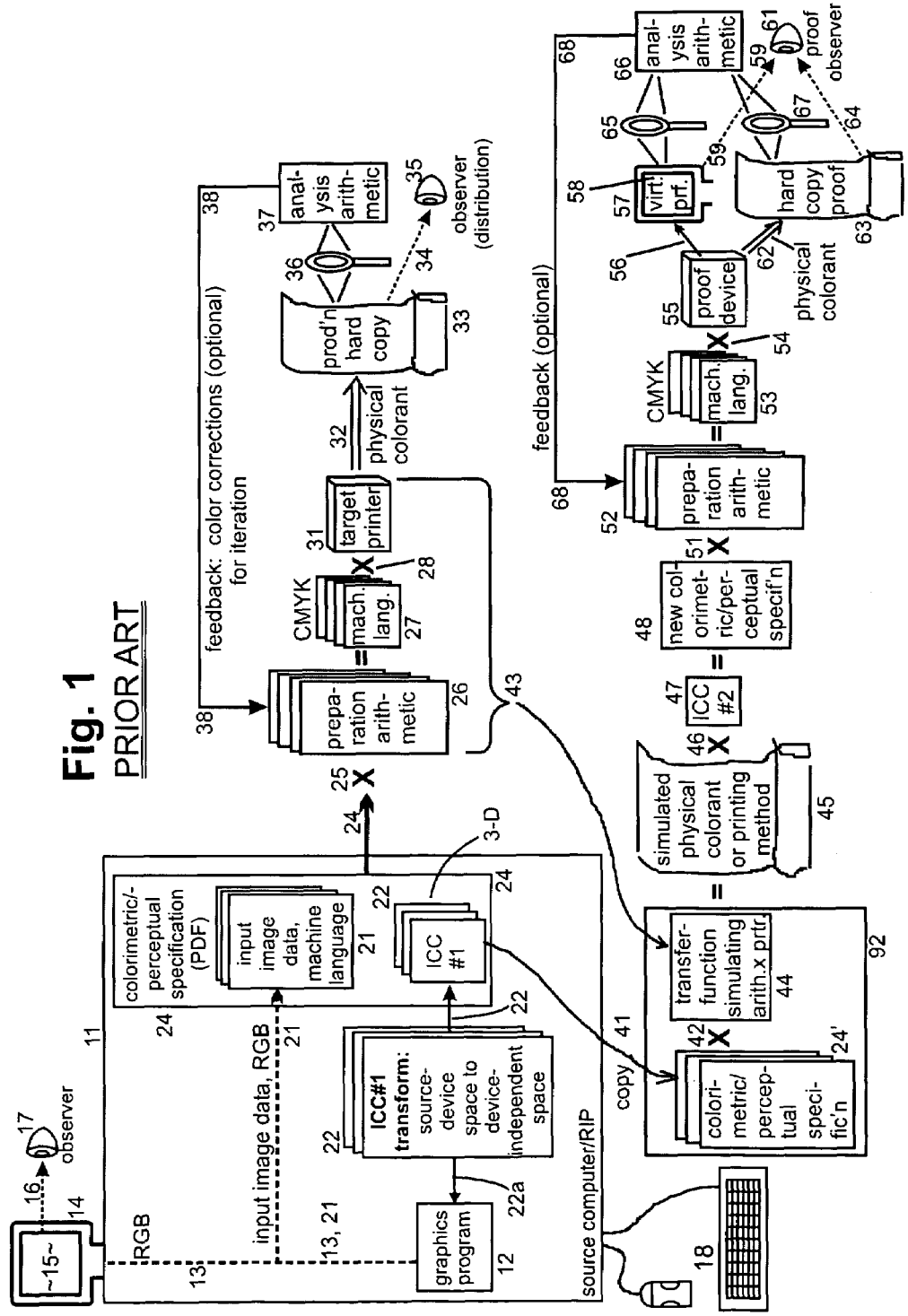
FIG. 1 is a block diagram and flow chart representing conventional equipment and procedures for proofing.

In functional terms, however, it can convert the monitor signals 13, 21 into an image data set that represents almost exactly what an observer 35 (FIG. 1) would perceive when looking 34 at the production hardcopy 33—or, equivalently, when looking at the previously mentioned simulation 45 in the conventional proofer data pipeline. Thus if applied to the monitor signals the conversion 163 would produce a perceptual data set nearly identical to the color data in the "new colorimetric/perceptual specification" 48 in that pipeline.

In short this composite profile 163 represents a single conversion that takes into account the profile of an original source device 14 as well as both the forward and approximate-inverse profiles 122, 123 of a production printer. Those three profiles are in effect concatenated or convolved by the novel preprocessing module 161, into a new kind of source profile.

Conceptually, i.e. in principle, it remains only to apply this new profile 163 to the original monitor data, converting that data into the perceptual near-equivalent (but assuming an observer looking at the production-printer output), and then adapt the results to the proofer 55 by application of its profile 126, to reconvert the perceptual data into proofer machine signals. As will be recalled, however, the conventional way of accomplishing such dual or serial conversions is not to convert the data twice—but rather first to combine the source profile with the proofer profile 126, and then second to apply that composite profile to the image data.

This is exactly what is done according to preferred embodiments of the invention. In the single-stage proofer-station RIP 141, the novel three-profile composite 163 and the proofer profile 126 are combined 142 to make a final composite transform 143.

This final composite 143 is then applied 144 to the monitor signals 21 to generate machine signals 53 for operating the proofer. If the proof is acceptable, then original document 24 can be sent to the production printer for use in generating production hardcopies.

It is not strictly necessary that the three-way composite profile be inserted into the proofing file 164. Some generally standard RIPs can receive the composite profile by separate transmission or from a separate source, rather than extracting it from a proofing file. Insertion of the hybrid composite 165 into the proofing file 164, however, does serve to further enhance the capability of the invention to enable make high-quality proofs using an entirely standard printer-and-RIP installation at the proofer.

2. Details of Transform Consolidation

As suggested above, in the now-preferred implementation the preprocessor 161 locates the storage area for color-space transforms (the so-called "color-space structures") in the PDF proofing file 24. If the transform is of the ICC-based type this process ensues:

the original ICC profile 22 is extracted and saved to disc;
that ICC profile is merged 163 with both production-printer-specific transforms 122, 123 to take into account the gamut of the actual production printer 31, forming the new three-way composite profile 165; and
the new ICC profile 165 is inserted into the PDF storage area in an expanded proofing file 164, along with (optionally) the original transform 22.

The second of these steps, the merger, is in one sense analogous to that in the conventional dual-RIP-stage system detailed in subsection (i) of the "BACKGROUND" section of this document: an input-gamut color sampling is employed. Here, however, a third conversion stage is required.

In this case, anomalously in relation to the prior art, the composite profile or transform that emerges from modification has the same dimensions, so to speak, as two 22, 123 of its three constituent profiles—namely, machine-to-perceptual. The three-stage transformation thus includes:

obtaining uniform sampling of the colors in the original color space;
processing these sample colors through the source-device profile to obtain a corresponding perceptual sampling;
processing the perceptual samples through the perceptual-to-machine (forward) profile 122 for the specific production printer 31 to obtain corresponding press-color samples—very much as done conventionally in the first RIP stage 111, but now only for the gamut samples rather than for an entire actual image-data array;
processing the press-color samples through the machine-to-perceptual (inverse) production-printer transform 123 to find corresponding perceptual samples—substantially equal to those that would conventionally arise halfway through formation of the second-RIP-stage composite profile 133;
building an interpolation table with the result of these three sequential conversions; and
including the interpolation in another ICC profile 165, which is the modified ICC profile required for the novel method.

In effect the overall procedure does include two more conversion steps, to effect one more transform combination 142:

The standard single-stage RIP 141 now once again samples the gamut of the original source-device 14, and processes the gamut sample through the three-way composite 165, to again obtain a corresponding perceptual-space sampling (predicting color appearance from the production press); and
this new perceptual-space sampling is then processed through the proofer transform 126 in a simulation of the conventional way, to yield substantially the same proofer-driving signal sampling conventionally obtained from the second RIP stage;
the signal-sample values are then rebuilt into a new interpolation table, which can then be identified as the composite transform 143; and that table is used conventionally within the single-stage RIP as set forth above.

To recap: by processing input colors through the interpolation table in the modified ICC profile 165, the result obtained is an approximation of what would be obtained by processing the colors through the three upstream ICC profiles 22, 122, 123. Thus the output from the modified ICC profile 165 is a device-independent prediction of color as it will appear when printed by the production printer.

Applying this profile 165, at the source-device input terminal 167 of the single-stage RIP 141, leads to formation of a new composite profile 143 substantially identical to that in the conventional second RIP stage 131. Applying this new composite 143, in turn, to the source-device color signals 21 yields machine-language image data 53 for driving the proofer 55, substantially identical to those obtained in the conventional dual-stage RIP system.

Analogously to the mapping sensitivity in the conventional system, imperfections in mapping lead to imperfections now in the three-way composite transform 165, and in accuracy of the proof. If the original color space or transform is not ICC-based, but is a so-called "calibrated" color space, it is ordinarily a routine matter to compute an ICC profile which is equivalent to the original color space. The same process described above can then be used.

The above disclosure is intended as merely exemplary, and not to limit the scope of the invention—which is to be determined by reference to the appended claims.

What is claimed is:

1. A method of making a preproduction proof of an image, interrelating three devices, namely an imaging device that has been used as an image monitor to create a proofing file for an image, and a first output device that is a production hardcopy printer which is intended to be used as a target output device to produce a production hardcopy output of the image, and a second output device that is a proof generating device; said proofing file comprising at least two sets of data, namely an imaging-device signal set representing the image and an embedded color pro-file of the imaging device; said method comprising the steps of:

obtaining color profiles associated with:
said imaging device that has been used as an image monitor,
said production hardcopy printer, and
said proof generating device;
combining the monitor and printer color profiles to form a single composite color profile that represents a conversion from monitor-control signals to perceived appearance of hard-copy color that will be seen in the production hardcopy output of the image; and
using the single composite color profile and the proof-generating-device color profile to control said proof generating device;
wherein the proof generating device receives signals that include information representing at least three color profiles, namely said profiles associated with the imaging device, the production hardcopy printer, and the proof generating device respectively.

2. The method of claim 1, wherein the using step comprises:
   modifying the proofing file by inserting data of the single composite color profile into the proofing file; and
   then providing the modified proofing file to the proof generating device.

3. The method of claim 2, wherein: the using step produces a proof-generating-device output that emulates appearance of the production hardcopy output.

4. The method of claim 3, wherein:
   the using step controls said proofing device, and any RIP associated with said proofing device, that are completely standard in regard to display of colors.

5. The method of claim 4, wherein:
   the using step controls a maximum of one RIP, associated with said proofing device.

6. The method of claim 5, wherein:
   the obtaining step comprises obtaining another transform representing a colorimetric profile of visible color produced by the production hardcopy printer, as a function of color signals directed into the production hardcopy printer.

7. The method of claim 1, wherein:
   the obtaining step comprises obtaining a transform representing a colorimetric profile of color seen on an image monitor as a function of device-language signals driving the monitor.

8. The method of claim 1, wherein:
   the obtaining step comprises obtaining a transform representing color signals to be directed into the proof device, as a function of a perceptual representation of visible color to be displayed by the proof device.

9. The method of claim 1, wherein:
   the obtaining step comprises obtaining one transform representing color signals to be directed into the production hardcopy printer, as a function of a perceptual representation of visible color to be displayed in the hardcopy.

10. The method of claim 9, wherein:
    the obtaining step comprises obtaining another transform representing a colorimetric profile of visible color produced by the production hardcopy printer, as a function of color signals directed into the production hardcopy printer.

* * * * *

UNITED STATES PATENT AND TRADEMARK OFFICE
CERTIFICATE OF CORRECTION

| | | |
|---|---|---|
| PATENT NO. | : 7,453,597 B2 | Page 1 of 1 |
| APPLICATION NO. | : 10/346610 | |
| DATED | : November 18, 2008 | |
| INVENTOR(S) | : Rodolfo Jodra et al. | |

It is certified that error appears in the above-identified patent and that said Letters Patent is hereby corrected as shown below:

In column 5, line 11, delete "calorimetric" and insert -- colorimetric --, therefor.

In column 6, line 4, delete "calorimetric" and insert -- colorimetric --, therefor.

In column 16, line 47, delete "calorimetric" and insert -- colorimetric --, therefor.

In column 16, line 58, delete "calorimetric" and insert -- colorimetric --, therefor.

In column 20, line 50, in Claim 1, delete "pro-file" and insert -- profile --, therefor.

In column 20, line 60, in Claim 1, delete "hard-copy" and insert -- hardcopy --, therefor.

Signed and Sealed this
Sixth Day of December, 2011

David J. Kappos
*Director of the United States Patent and Trademark Office*